(12) United States Patent
Magnusson

(10) Patent No.: US 11,073,647 B2
(45) Date of Patent: Jul. 27, 2021

(54) ULTRA-SPARSE DIELECTRIC RESONANT POLARIZERS AND ASSOCIATED METHODS

(71) Applicant: BOARD OF REGENTS, THE UNIVERSITY OF TEXAS SYSTEM, Austin, TX (US)

(72) Inventor: Robert Magnusson, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 16/819,995

(22) Filed: Mar. 16, 2020

(65) Prior Publication Data

US 2020/0225392 A1    Jul. 16, 2020

Related U.S. Application Data

(63) Continuation of application No. 15/162,070, filed on May 23, 2016, now Pat. No. 10,591,654.

(60) Provisional application No. 62/164,724, filed on May 21, 2015.

(51) Int. Cl.
*G02B 5/30* (2006.01)
*H01Q 15/24* (2006.01)

(52) U.S. Cl.
CPC ......... *G02B 5/3008* (2013.01); *G02B 5/3075* (2013.01); *H01Q 15/24* (2013.01); *G02B 5/3058* (2013.01)

(58) Field of Classification Search
CPC .. G02B 5/3008; G02B 5/1861; G02B 5/3075; H01Q 15/24
USPC ........................................................ 359/352
See application file for complete search history.

(56) References Cited

U.S. PATENT DOCUMENTS

| 2007/0081246 A1* | 4/2007 | Stuck | G02B 5/203 |
| | | | 359/568 |
| 2009/0067774 A1* | 3/2009 | Magnusson | G02B 6/124 |
| | | | 385/10 |

* cited by examiner

*Primary Examiner* — Marin Pichler
*Assistant Examiner* — Mitchell T Oestreich
(74) *Attorney, Agent, or Firm* — J. Clinton Wimbish; Nexsen Pruet, PLLC

(57) ABSTRACT

The invention disclosed herein generally relates to wideband resonant polarizers that require extremely small amounts of matter in their embodiments. These polarizers can be made with dielectric materials such that light and other electromagnetic waves interacting with them suffer essentially no absorptive loss. This new class of polarizers is fashioned with dielectric or semiconductor nano/microwire grids that are mostly empty space if surrounded by air or vacuum. It is fundamentally and practically extremely significant that the wideband spectral expressions presented herein can be generated in these minimal systems. These ultra-sparse polarizers are useful in various spectral regions for numerous useful applications.

15 Claims, 11 Drawing Sheets

FIG. 1A
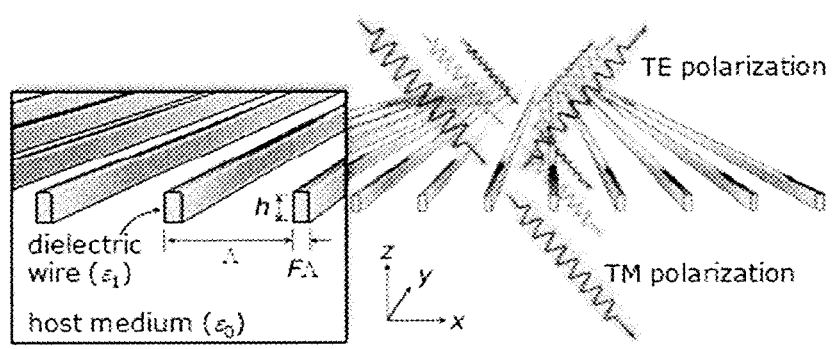
FIG. 1B
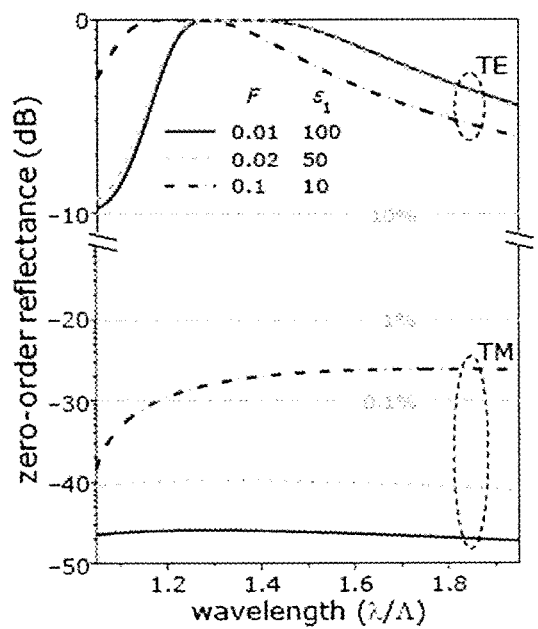
FIG. 1C
FIG. 1D
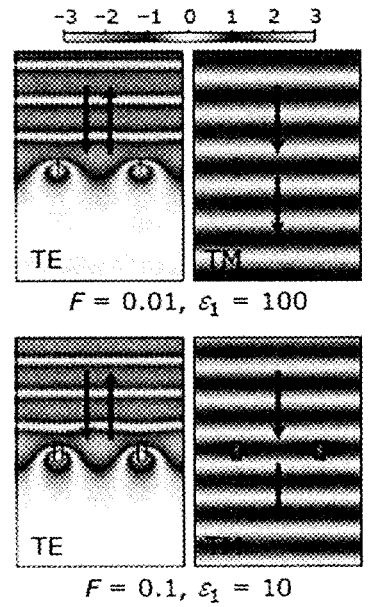

FIG. 3A
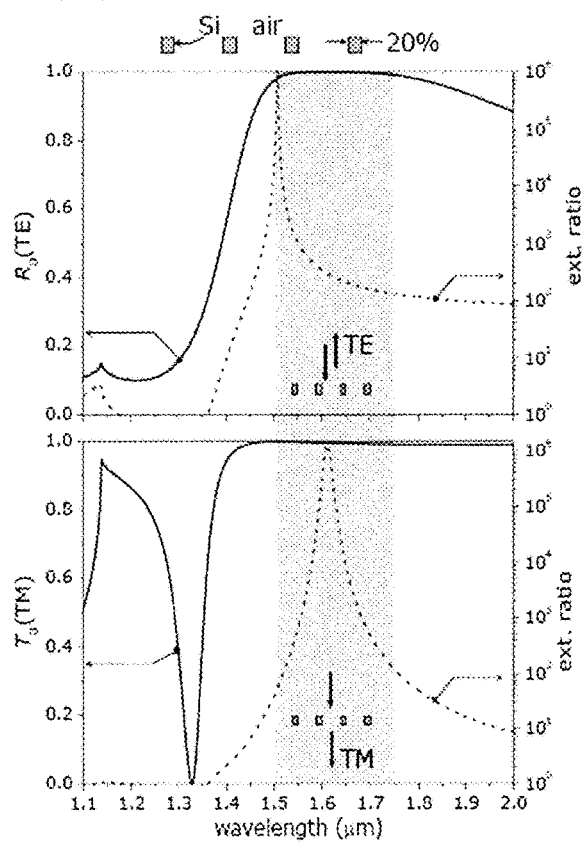
FIG. 3B
FIG. 3C
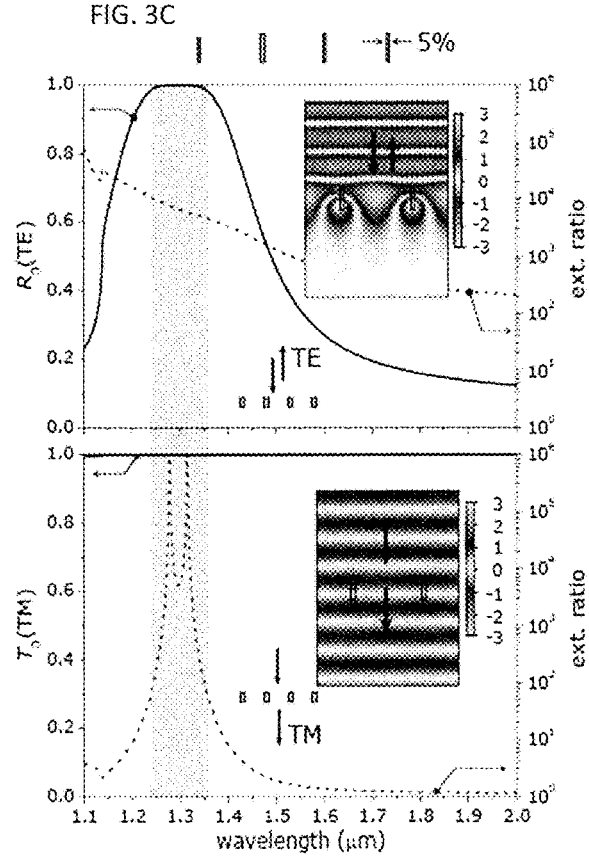
FIG. 3D

FIG. 7A
FIG. 7B
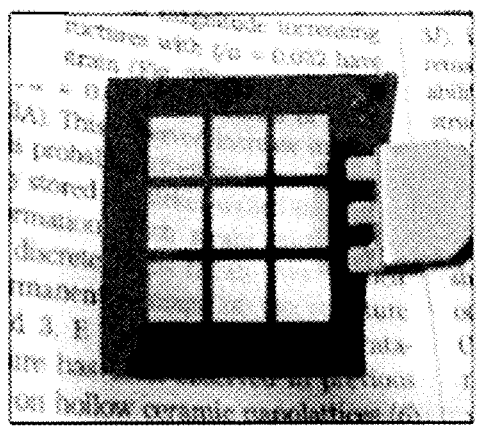
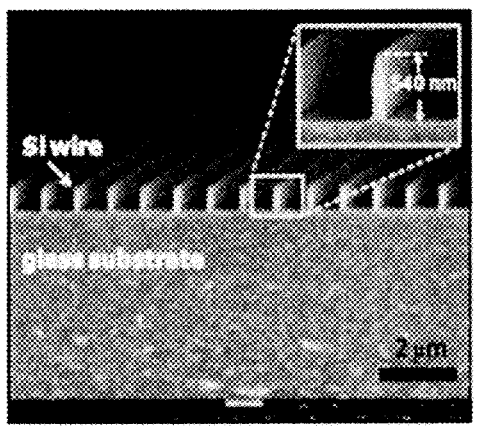
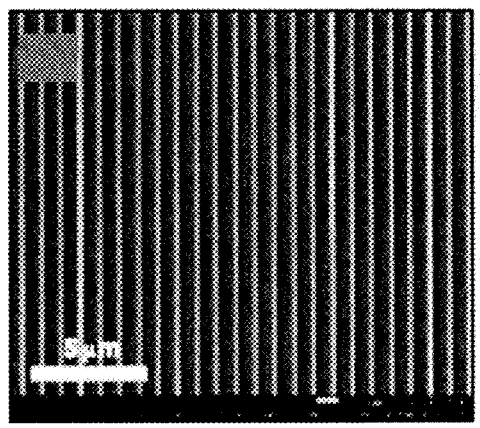
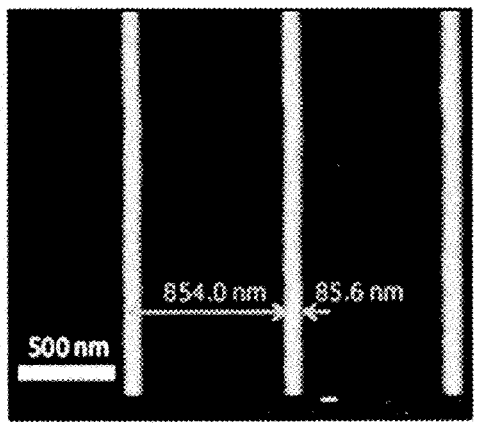
FIG. 7C
FIG. 7D

FIG. 8A
FIG. 8C
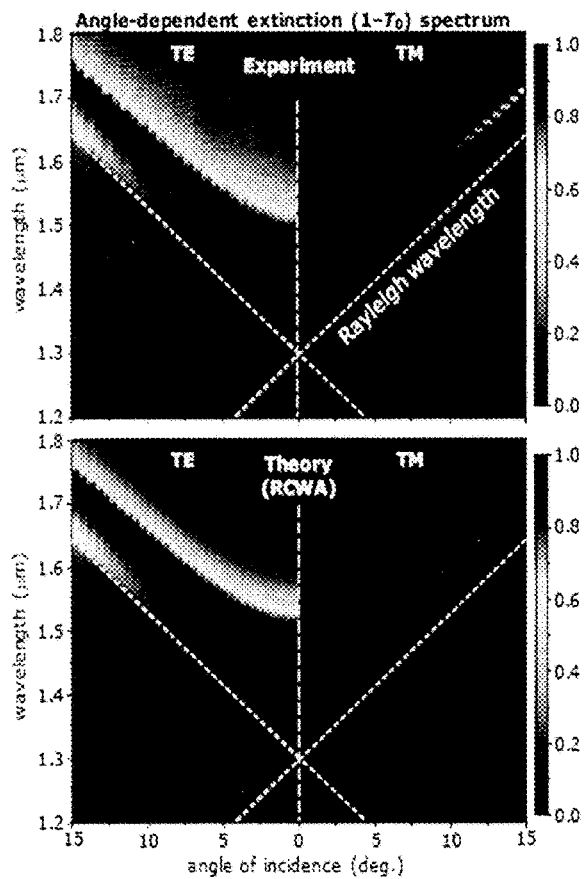
FIG. 8B
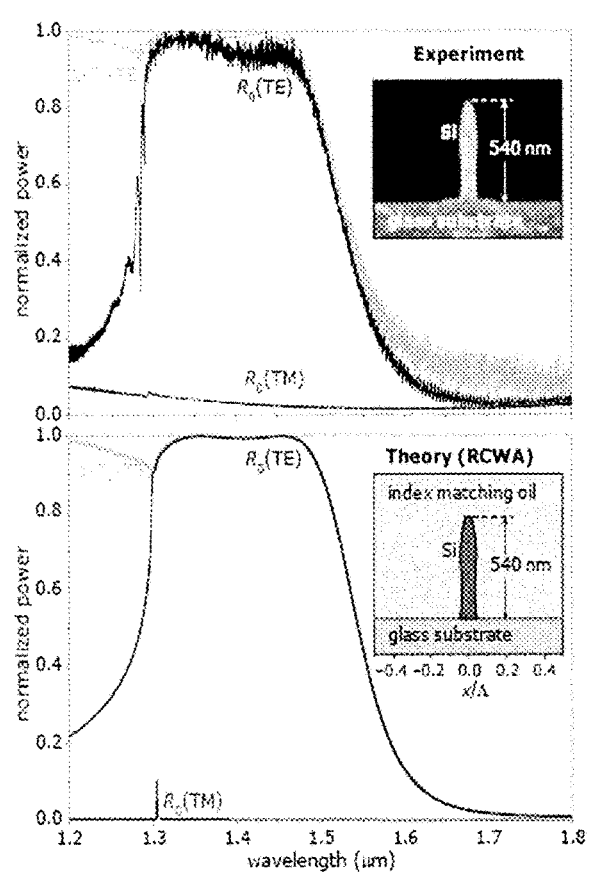
FIG. 8D

ULTRA-SPARSE DIELECTRIC RESONANT POLARIZERS AND ASSOCIATED METHODS

This application is a continuation of U.S. patent application Ser. No. 15/162,070, filed May 23, 2016, now U.S. Pat. No. 10,591,654, which claims priority to U.S. Provisional Patent Application No. 62/164,724, filed May 21, 2015, each of which is incorporated by reference in its entirety.

FIELD OF THE INVENTION

The present invention relates generally to the field of photonic or electromagnetic devices and, in particular, to ultra-sparse resonant polarizers fashioned with dielectric media or low-loss semiconductors. The polarizers operate across wide spectral bands and possess high extinction ratios.

BACKGROUND

Periodically patterned films exhibit strong resonance effects that originate in quasi-guided, or leaky, waveguide modes [1-7]. With thickness and period on the order of the wavelength, these compact elements yield versatile electromagnetic spectra and surface-localized energy states with controllable Q factors. Using powerful electromagnetic design methods, the spectral bands of these sub wavelength resonant leaky-mode elements can be engineered to achieve photonic devices with practical attributes. We note that the terms "photonic," "optical" and "electromagnetic" may be used interchangeably herein. For example, a single periodic layer with one-dimensional periodicity enables narrow-line filters, polarizers, reflectors, and polarization-independent elements [8].

A polarizer is an optical device that passes an electromagnetic wave with one particular polarization state and blocks all other states. Polarizers are essential in diverse photonics applications including display [9], microscopy [10], polarimetric astrophysical observation [11], laser machining [12], and quantum information processing [13]. In particular, nanostructured and sub wavelength polarizers offer compact integrability [14,15], thermal stability in high-power systems [12,16], and space-variant vector beam generation [17,18].

Conventional polarizers based on natural crystals and multilayer thin films are commonplace. Dichroic polarizing crystals absorb light with particular polarization along a defined crystal axis permitting another state to survive. Multilayer thin films are used in polarizing beam splitters at particular angles of incidence; they are not useful at normal incidence. Wire-grid polarizers (WGPs) are made with parallel grids of wires that have nanoscale spatial features for visible light wavelengths. Wire grid polarizers are in wide practical use and sold commercially by several suppliers. In the ~300-4000 nm spectral region, the grids may be glass-slide enclosed whereas in the 4-12 μm region they are often silicon supported. The WGPs operate in transmission and work by absorbing and reflecting the polarization state with the electric-field vector along the wires. WGPs are wideband and transmit typically more than 75% of the input light that is in the desired polarization state. Advantages of devices not based on metals, such as those disclosed, include low loss and attendant high efficiency and ability to work as good polarizers in reflection, transmission, or both.

Sub wavelength periodic thin-film polarizers fashioned in dielectric media provide robust high-power performance and feasible fabrication in most practical frequency domains. Innovative polarizers have been implemented by combining multilayer films with linear sub wavelength gratings to induce polarization selectivity at normal incidence [19, 20]. Advanced polarizer designs in simple architecture were subsequently demonstrated engaging guided-mode resonance effects [21-23]. These devices operate with a broadband resonant reflection in one polarization state and concomitant transmission in the orthogonal state.

What is needed is the ability for nanowire grid polarizers to strongly polarize incident light in reflection and transmission across considerable spectral and angular levels. Nano wire grid is invisible in Transverse-Magnetic (TM) polarization while it resonates effectively in Transverse-Electric (TE) polarization. All these are achieved by minimal material embodiment that is mostly empty space. This polarizer is feasible in wide spectral domains including the near-infra red, THz and longer wavelength regions.

SUMMARY

The invention relates to nanowire grid polarizers that strongly polarize incident light in reflection and transmission across considerable spectral and angular levels. Nano wire grid is invisible in Transverse-Magnetic (TM) polarization while it resonates effectively in Transverse-Electric (TE) polarization. All these are achieved by minimal material embodiment that is mostly empty space. This polarizer is feasible in wide spectral domains including the near-infra red, THz and longer wavelength regions.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears.

FIGS. 1A-1D present theoretical performance of ultra-sparse dielectric nanowire arrays.

FIGS. 3A-3D exemplify theoretical performance of ultra-sparse Si nanowire arrays as polarizing elements with the illuminating wave at normal incidence.

FIGS. 7A-7D show fabricated prototypes and attendant SEM views.

FIGS. 8A-8D show experimental performance of an ultra-sparse Si nanowire array polarizer and comparison with computed results.

DESCRIPTION OF ILLUSTRATIVE EMBODIMENTS

Figure 2A:
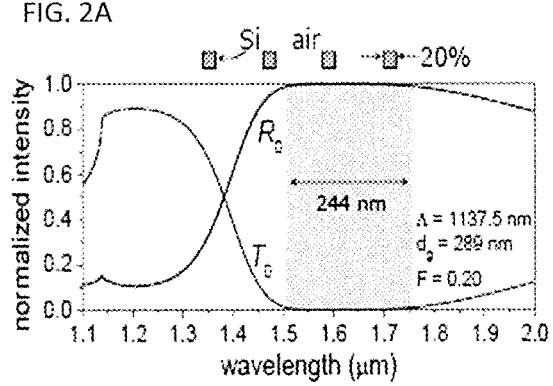
FIGS. 2A-2D show computed performance of broadband reflectors made with arrays of extremely sparse rectangular Si nanowires.

It is widely assumed that large refractive-index contrast and high average refractive index are necessary to support broadband performance with attendant multi-mode resonance excitation. In contrast, here we show that simple dielectric nanowire grids with minimal material embodiment render remarkable wideband polarization selectivity in both reflection and transmission. Thus, a representative dielectric nanowire grid is illustrated in FIG. 1(a) along with its polarizing functionality. The structure is defined by the period $\Lambda$, wire fill factor F, height or thickness h, dielectric constant $\varepsilon_1$, and dielectric constant $\varepsilon_0$ of the host medium. Relative to the array geometry, transverse electric (TE) polarization corresponds to the electric field oscillating along the wire (y-axis) and the orthogonal polarization is denoted as transverse magnetic (TM) polarization.

Using rigorous coupled-wave analysis (RCWA) [24], we numerically calculate the zero-order reflectance ($R_0$) spectra under TE- and TM-polarized light incidence for three example designs with parameter sets ($\varepsilon_1$, F, h/$\Lambda$)=(100, 0.01, 0.315), (50, 0.02, 0.317), and (10, 0.1, 0.342). We take free space, or vacuum, with $\varepsilon_0=1$ as the host medium. In these examples, the product $\varepsilon_1 F$ is constant at 1 with wire height chosen to maximize the TE resonance reflectance. In FIG. 1(b), the $R_0$(TE) spectra show broadband reflection over the normalized full-width at half-maximum bandwidth $\Delta\lambda/\Lambda$~20%. The normalized bandwidth of the reflection plateau where $R_0$(TE)≥0.99 is $\Delta\lambda/\Lambda$~13% for all three cases. This broadband reflection occurs over a wide acceptance angle of ~20° for these examples.

In stark contrast, as shown in FIG. 1(b), the TM reflectance $R_0$(TM) is well below $10^{-2}$ and essentially negligible. Note that $R_0$(TM) is less than $3\times10^{-5}$ for F=0.01 and $\varepsilon_1=100$. The TE and TM field distributions at the center wavelength of the TE-reflection plateau for the examples with parameter sets ($\varepsilon_1$, F, h/$\Lambda$)=(100, 0.01, 0.315) and (10, 0.1, 0.342) are shown in FIGS. 1(c) and 1(d), respectively. In each case, there is a clear resonant field enhancement in the array for TE polarization whereas TM-polarized light propagates freely through the device without significant perturbation of the propagating wave fronts. Note in FIGS. 1(c) and 1(d) that an approximate to-scale representation of the nano grating is inset into the figures; it is particularly evident in FIG. 1(c) that the field concentrates on the nano ridges as it is redirected transversely and then reradiated into the vertical +z direction. In contract, in FIG. 1(d) there is no perceptible interaction found by the simulations with the TM polarized wave passing through unaffected to within the computational resolution applied in the graph.

The devices presented herein operate under the guided-mode resonance (GMR) effect. The resonance reflection is driven by excitation and reradiation of lateral Bloch modes via the ±1 evanescent diffraction orders [25]. The generation of a wave vector directed along the +z-axis sustaining the propagation of the reflected wave is a diffractive effect and not related to reflections off grating ridge interfaces [26]. The nano grids presented have exceedingly small fill factors F and attendant thin grating ridges. They are capable of supporting only a single z-directed ridge mode. Thus, interference between multiple local ridge modes (classic Fabry-Perot modes running along the z-direction in FIG. 1) plays no causal roles in these devices [27]. In this picture, TM-polarized input light is neither diffracted nor guided whereas TE-polarized light is both diffracted and guided and therefore capable of undergoing guided-mode resonance. The effects in play are enabled by the differences in the material manifestation of the device as experienced by the input light in alternate polarization states. The exceptional performance of these devices illustrated herein derives from this fact.

Since interference between ridge Fabry-Perot (FP) modes is not the cause of the wideband reflection, it follows that the number of FP modes in a grating ridge is immaterial as far as the fundamental physics of general resonance elements is concerned. Indeed, FIG. 1 shows that wideband reflectors are achievable with a single supported ridge mode. This leads to the discovery of resonant elements that are mostly free space with minimal physical bulk—an extremely interesting and important finding and basis for the devices disclosed herein.

Before we proceed, we might ponder as to what approximate values of fill factor and attendant ridge width is pertinent to this endeavor. Let's approximate the grating ridges in the model in FIG. 1(a) as parallel slab waveguides with thickness t=F$\Lambda$ and recall the normalized frequency parameter $V=(2\pi t/\lambda)[n_f^2-n_{sg}^2]^{1/2}$ and the associated dispersion relation from the paper by Kogelnik and Ramaswami [28]. We take the ridge modes as classic slab modes propagating along the z-direction. Here, the refractive index of the waveguide core is $n_f=\varepsilon_1$ and the cladding index is $n_{sg}=n_c=\varepsilon_0=1$ where we use the fact that, in general, dielectric constant and refractive index are related by $\varepsilon=n^2$. The largest value of the V parameter for a symmetric slab to guide mode $\nu$ is $V_{max}=(1+\nu)\pi$ [28]. Moreover, recall that efficient reflectors operate in the subwavelength regime $\Lambda<\lambda/n_c$. The smallest wavelength in the reflector spectrum at the short-wave edge can be approximated as the Rayleigh wavelength $\lambda=\lambda_R=n_c\Lambda$. Combining these expressions for a grating membrane in air, we get $F_{max}=(v+1)/2\ [\varepsilon_1-1]^{1/2}$ and $F_{max}=(v+1)$ 0.15 for the case of silicon with $n_{Si}=3.48$ and $\varepsilon_1=3.48^2$ in a background of air. To operate with a single ridge mode $v=0$, then, approximately $F<0.15$. On the other hand, for typical wideband reflectors [26, 27, 29, 30], $F>0.5$—hence, it is not surprising that several ridge modes may exist in these devices. The approximate values of $F_{max}$ for other ridge materials and other host media may be similarly established. For example, for $TiO_2$ with refractive index near 2.6 in an air host medium, $F_{max}=0.21$; if the host is a polymer with refractive index of 1.5, $F_{max}=0.24$. The actual more exact values of F to support a single predominant ridge mode are determined by rigorous numerical computations; these values of F tend to be slightly larger than the analytical approximation.

EXAMPLES

Embodiments described herein can be understood readily by reference to the following detailed description, examples, and figures. Elements, equipment, materials, spectral regions and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

Example 1. Silicon Nanoridge Polarizer with Detailed Explanations

Figure 2B:
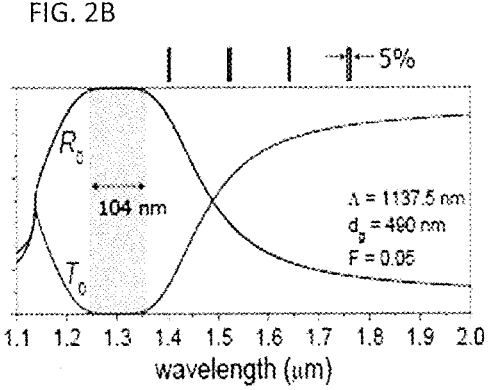
Figure 2C:
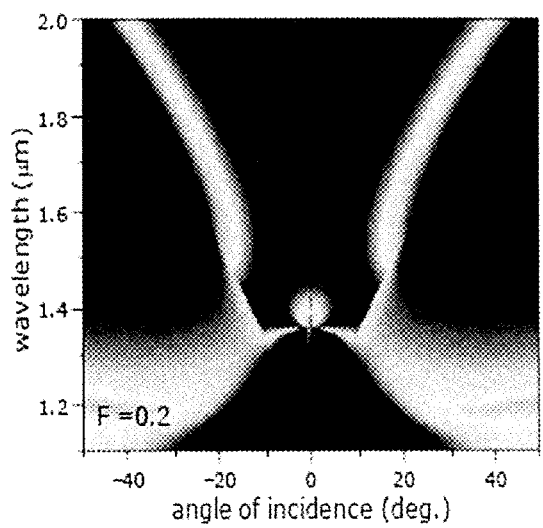
Figure 2D:
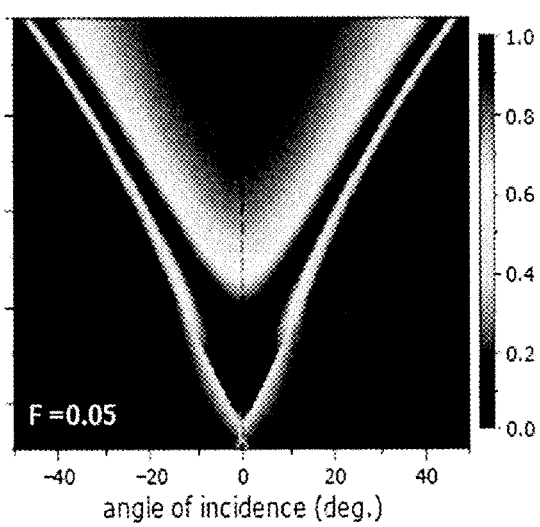
Figure 4A:
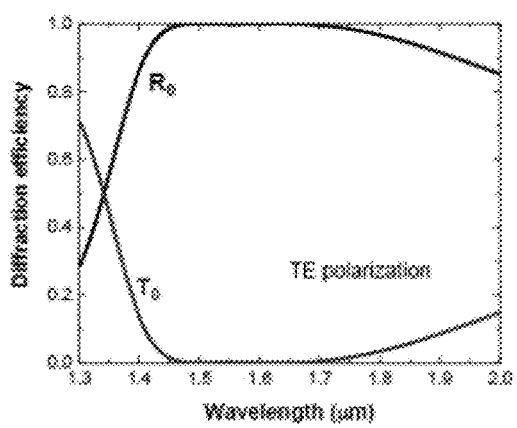
FIGS. 4A-4F illustrate the performance of a sparse GMR polarizer with 20% fill factor.
Figure 4B:
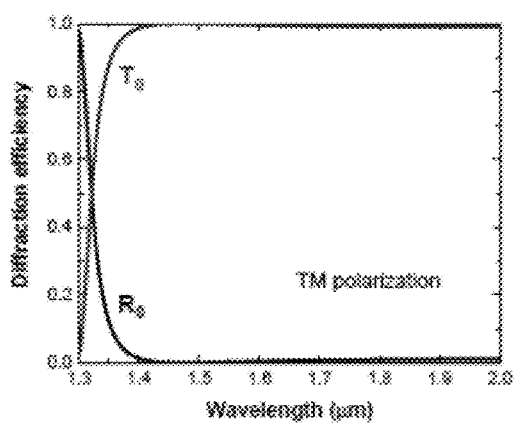
Figure 4C:
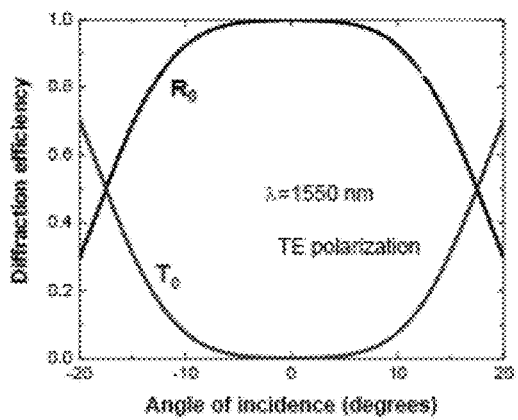
Figure 4D:
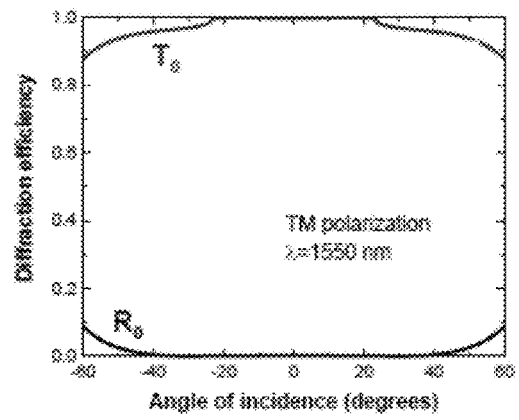
Figure 4E:
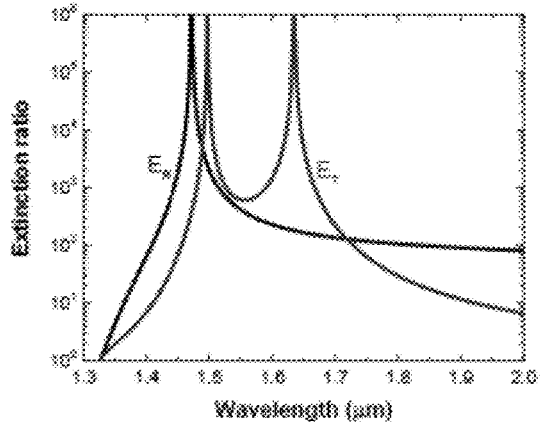
Figure 4F:
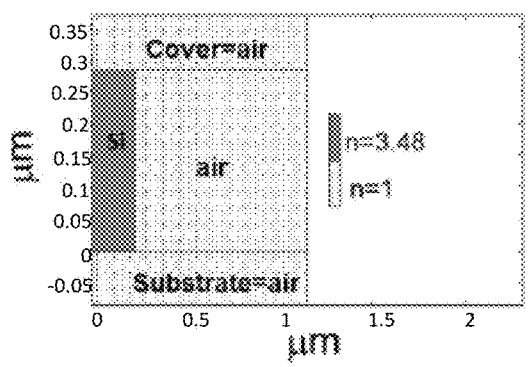
Figure 5A:
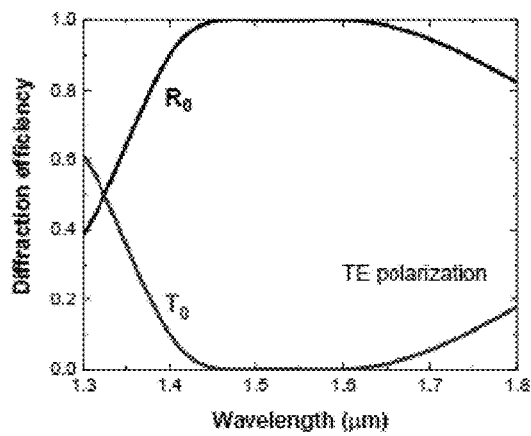
FIGS. 5A-5F provide computed performance of a sparse GMR polarizer with 10% fill factor.
Figure 5B:
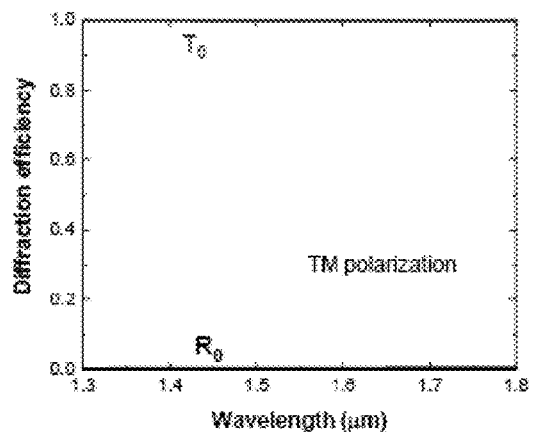
Figure 5C:
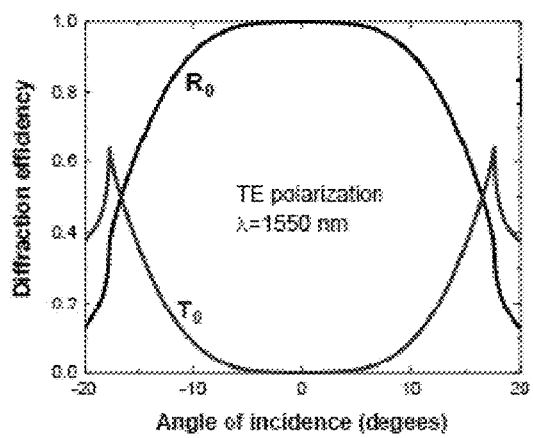
Figure 5D:
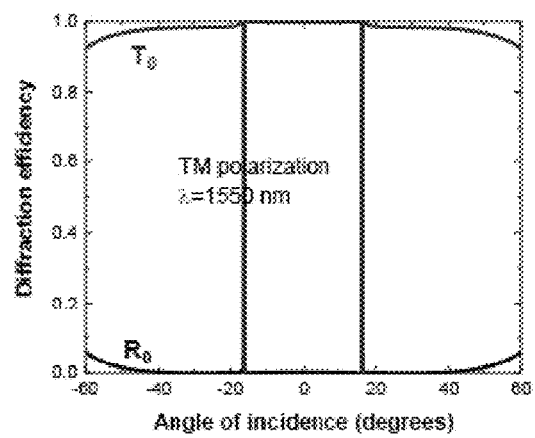
Figure 5E:
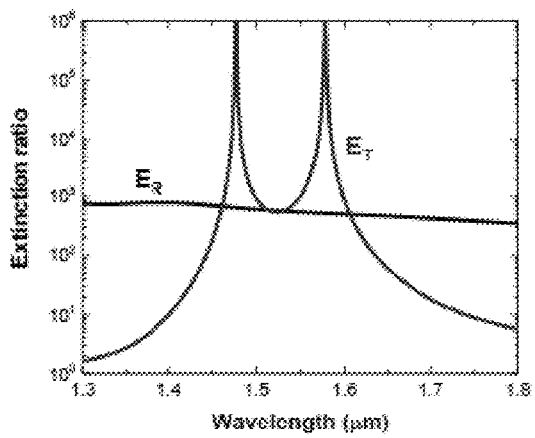
Figure 5F:
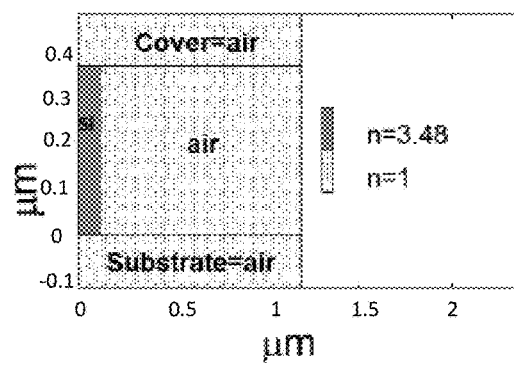
Figure 6A:
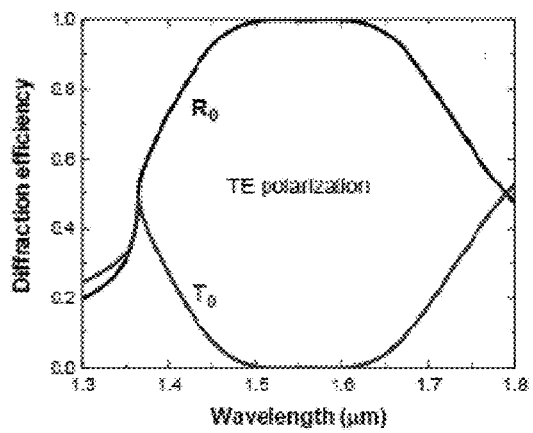
FIGS. 6A-6F summarize the characteristics of a sparse GMR polarizer with 5% fill factor.
Figure 6B:
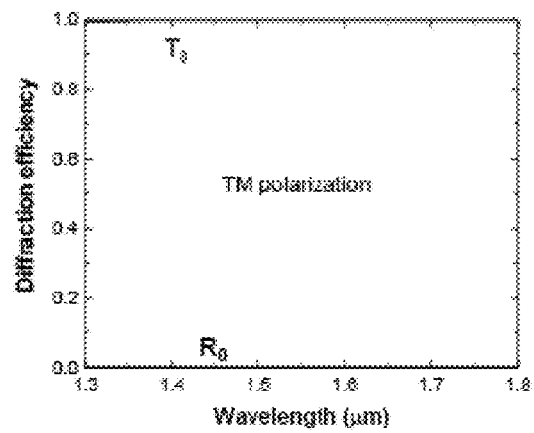
Figure 6C:
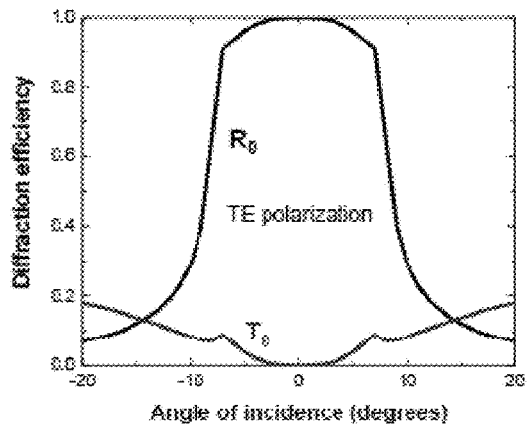
Figure 6D:
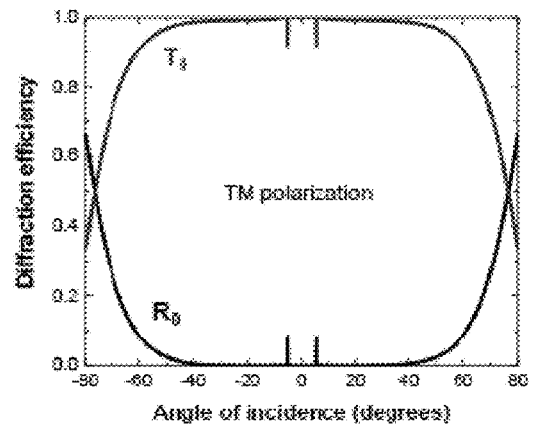
Figure 6E:
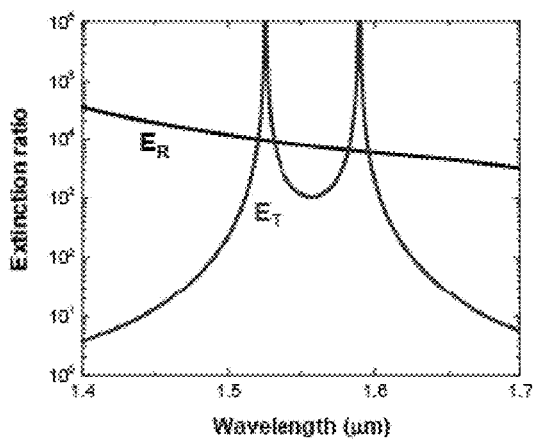
Figure 6F:
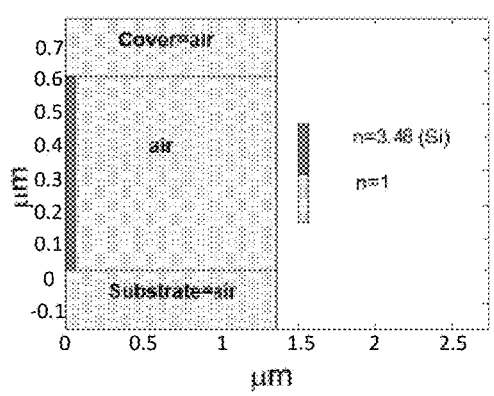
Figure 9:
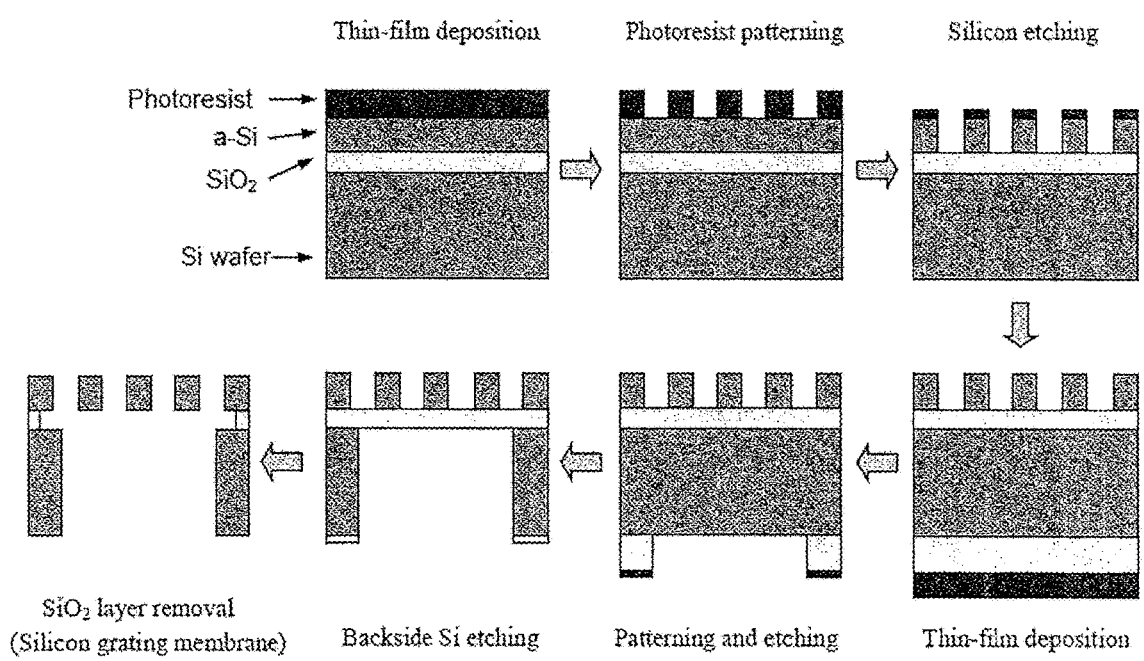
FIG. 9 outlines the fabrication process of an example silicon-grating membrane structure.
Figure 10A:
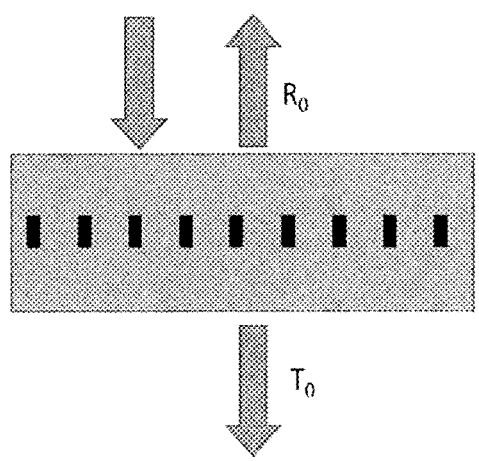
FIGS. 10A-10B depict a polarizer incorporated into a solid host medium.
Figure 10B:
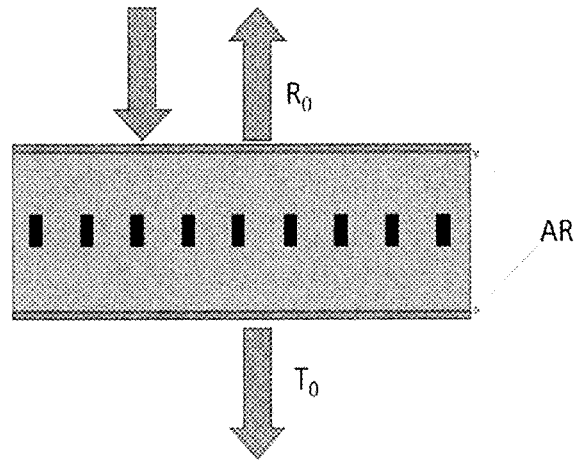
Figure 11:
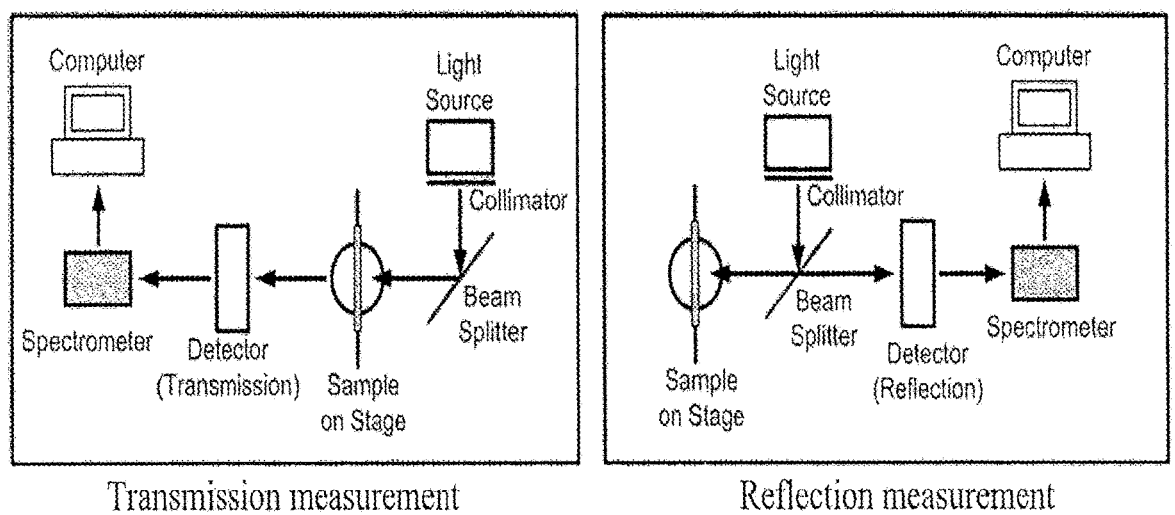
FIG. 11 provides a schematic view of a generic spectral measurement setup.

We now theoretically demonstrate broadband reflection from ultra-sparse arrays of Si nanoridges in air using particular example parameter sets. FIGS. 2(a) and 2(b) show spectral profiles of the zero-order reflectance ($R_0$) and transmittance ($T_0$) under normal incidence of TE-polarized light on extremely sparse Si gratings with fill factors of 20% and 5%, respectively. Here, the term "zero-order" refers to the case of sub wavelength gratings (period $\Lambda<$wavelength $\lambda$) such that no higher-order diffracted waves exist within the operational spectral and angular ranges of interest for any given application. In FIG. 2(a) for F=0.2 ($V<\pi$ for $\lambda>1.5$ μm so that only the fundamental slab mode propagates within the reflector's bandwidth), the high-reflection band for $R_0>99\%$ covers a 244-nm range. In FIG. 2(b), an array with F=0.05 still performs as a good reflector with high-reflection bandwidth of 104 nm even though the operational layer is 95% empty space! The angle-dependent $R_0$ spectra shown in FIGS. 2(c) and 2(d) for these materially sparse reflectors reveal high angular tolerance and the absence of sharp spectral features generally arising in strongly modulated high-index grating reflectors supporting multiple leaky modes. This is an additional beneficial attribute of the proposed sparse reflectors. The nanoridge grating devices in these examples operate with a single ridge mode. In FIG. 2(a), the zero-order reflectance ($R_0$) and transmittance ($T_0$) spectra pertain to an array with period $\Lambda=1137.5$ nm, Si grating thickness $d_g=289$ nm, and fill factor F=0.2. In FIG. 2(b), the $R_0$ and $T_0$ spectra are for $\Lambda=1137.5$ nm, $d_g=490$ nm, and F=0.05. FIG. 2(c) shows the angle-dependent $R_0$ spectrum for the array in FIG. 2(a). FIG. 2(d) provides the angle-dependent $R_0$ spectrum for the array in FIG. 2(b). The grey regions in (a) and (b) indicate the high-reflection band for which $R_0>99\%$. The sketches on top of FIG. 2(a) and FIG. 2(b) show the arrays on approximately correct vertical and horizontal scales.

FIG. 3 summarizes theoretical performance of the nanowire arrays introduced in FIG. 2 as polarizers and as polarizing beam splitters. The illuminating wave is at normal incidence. For the design with F=0.2 in FIGS. 3(a) and 3(b), the TM transmittance $T_0(TM)>99.2\%$ for the high TE-reflection band with $R_0(TE)>99.0\%$ indicated by the grey band spanning the 244-nm-wide wavelength range. The polarization extinction ratios (generally defined as intensity ratio of wanted to unwanted polarization) in reflection and transmission in the grey band fall in the ranges of $10^2<R_0(TE)/R_0(TM)<10^6$ and $10^2<T_0(TM)/T_0(TE)<10^6$, respectively. For the deeply-sparse array design with F=0.05 in FIGS. 3(c) and 3(d), the TM transmittance $T_0(TM)>99.98\%$ for the high TE-reflection band with $R_0(TE)>99.0\%$ indicated by the grey band spanning the 104-nm-wide wavelength range. The polarization extinction ratios in reflection and transmission in the grey band are $4.7\times10^3<R_0(TE)/R_0(TM)<10^4$ and $10^2<T_0(TM)/T_0(TE)<6.8\times10^9$, respectively. Moreover, for subparts of these bands, the extinction ratios are even better. Importantly, these lossless polarizers have values of $R_0$ or $T_0$ of approximately 100% in contrast to analogous quantities for wire-grid polarizers.

The insets of FIGS. 3(c) and 3(d) show field distributions under TE- and TM-polarized light incidence, respectively. The electric field distribution under TE-polarized light incidence in FIG. 3(c) shows high-field concentration at the grating ridges consistent with excitation of a single vertical $TE_0$ guided mode. A corresponding, more diffuse, field enhancement appears in the air gaps between the Si nanowires. This excitation induces broadband constructive interference in reflection and destructive interference in transmission. Complete destructive interference in the TE-polarized transmission demands two different transmission pathways with equal amplitudes and a π phase difference. In contrast to the TE field distribution, the incident TM wave in the inset of FIG. 3(d) does not interact strongly with the nanowires and transmits essentially unperturbed through the structure. A simple explanation is that the effective refractive index as computed by effective-medium theory [31] for TM polarized light is very close to unity whereas the TE effective index deviates sufficiently from unity to support the lateral evanescent diffraction order generating the resonance response observed. For the insets, the wavelength of the incident wave is fixed at $\lambda=1300$ nm corresponding to the center wavelength of the high TE-reflection band. The field values in both figures are normalized by the incident field amplitude.

Example 2. Silicon Polarizer with F=0.2

FIG. 4 illustrates the performance of a sparse GMR polarizer with 20% fill factor. It is made with a silicon (n=3.48) membrane grating in air with cover-medium refractive index of $n_c=1$ and substrate-medium index $n_s=1$. Thus host-medium dielectric constant is $\varepsilon_0=1$. Device parameters are $d_g=280$ nm, $\Lambda=1115$ nm, and F=0.2. Here, zero-order reflectance $R_0>0.99$ from a wavelength of 1457 nm to 1728 nm yielding a 99% bandwidth of 271 nm. FIG. 4(a) shows the zero-order reflectance ($R_0$) and transmittance ($T_0$) spectra for TE polarization. FIG. 4(b) shows zero-order reflectance ($R_0$) and transmittance ($T_0$) spectra for TM polarization demonstrating extraordinarily wideband TM transmission of nearly 100%. FIG. 4(c) shows the angular spectrum of the polarizer at a fixed chosen example wavelength of $\lambda$=1550 nm for TE polarization. FIG. 4(d) shows the angular spectrum at the same example wavelength of $\lambda$=1550 nm for TM polarization. In both cases, there is a significantly-large flat angular band; for TM polarization it exceeds 20°. FIG. 4(e) shows the extinction ratio in reflection $E_R$ and transmission $E_T$ as a function of wavelength at normal incidence. FIG. 4(f) indicates a schematic drawing of a single period of the polarizer device denoting its dimensions to scale. The fraction of silicon s 20% as indicated by the axes with numbers in micrometers.

Example 3. Silicon Polarizer with F=0.1

FIG. 5 provides computed performance of a sparse GMR polarizer with 10% fill factor. It is made with a silicon (n=3.48) membrane grating in air ($n_c$=$n_s$=1). Parameters: $d_g$=370 nm, $\Lambda$=1190 nm, and F=0.1. Here $R_0$>0.99 from a wavelength of 1444 nm to 1635 nm yielding a 99% bandwidth of 191 nm. (a) Zero-order reflectance ($R_0$) and transmittance ($T_0$) spectra for TE polarization. (b) Zero-order reflectance ($R_0$) and transmittance ($T_0$) spectra for TM polarization; note the extremely wide TM transmission at nearly 100% across the whole wavelength range shown. (c) Angular spectrum at $\lambda$=1550 nm for TE polarization. (d) Angular spectrum at $\lambda$=1550 nm for TM polarization. (e) Extinction ratio in reflection $E_R$ and transmission $E_T$ as a function of wavelength. (f) Schematic scaled drawing of a single period of the polarizer indicating its dimensions. In FIG. 5(d), there is a rapid transition of transmission from $T_0$=1 to $T_0$=0 and back to $T_0$=1 across a narrow angular range. This is due to a GMR arising at an angle just before the Rayleigh anomaly where the first diffracted order emerges from the device. In this case, the GMR appears at $\theta_{GMR}$=16.20 while the Rayleigh anomaly occurs at $\theta_R$=17.6°.

Example 4. Silicon Polarizer with F=0.05

FIG. 6 summarizes the characteristics of a sparse GMR polarizer with 5% fill factor. Silicon (n=3.48) membrane grating in air ($n_c$=$n_s$=1). Parameters: $d_g$=584 nm, $\Lambda$=1356 nm, and F=0.05. Here $R_0$>0.99 from a wavelength of 1491 nm to 1625 nm yielding a 99% bandwidth of 134 nm. (a) Zero-order reflectance ($R_0$) and transmittance ($T_0$) spectra for TE polarization. (b) Zero-order reflectance ($R_0$) and transmittance ($T_0$) spectra for TM polarization. (c) Angular spectrum at $\lambda$=1550 nm for TE polarization. (d) Angular spectrum at $\lambda$=1550 nm for TM polarization. (e) Extinction ratio in reflection and transmission as a function of wavelength. (f) Schematic drawing of a single period of the polarizer indicating its dimensions.

Example 5. Experimental Polarizer Prototype

Considering the experimental feasibility of the proposed device concept, we note that various high-index materials are available to suit a given spectral region of interest. For example, semiconductors such as Si, GaAs, and Ge have dielectric constant in the range $\varepsilon$=10~20 in the near-infrared and telecommunication bands [32]. For operation at longer wavelengths, much higher dielectric constants are available. $ZrSnTiO_3$ ceramics [33] and perovskite-related oxides [34] have $\varepsilon$~100 in the THz domain. Artificial engineered materials are under development with hyperbolic metamaterials [35] for effective $\varepsilon$~100 in the near-infrared domain and with H-shaped metallic patch arrays [36] for effective $\varepsilon$~1000 at THz frequencies; this value of dielectric constant implies a polarization extinction ratio ~$4\times10^6$. Moreover, there are many available materials having transparent, low-loss bands in the visible spectral domain. For example, GaP, SiC, $TiO_2$, and GaN are representative materials with refractive index ranging from 2.4 to 3.5. Therefore, the disclosed device class is promising to attain high polarization selectivity in various frequency domains including the visible, near-infrared (IR), far-IR and THz spectral regions. It is noted that the device feature sizes including period scale approximately in proportion to the operational wavelength.

We experimentally demonstrate a Si-nanowire-grid polarizing beam splitter in the near-infrared region. The fabrication steps include sputtering a 540-nm-thick amorphous Si film on a 1-mm-thick microscope slide glass, ultraviolet laser interference lithography to form a photoresist grating mask, reactive-ion etching using a $CHF_3$+$SF_6$ gas mixture, and post-etch $O_2$ ashing to remove residual photoresist. FIG. 7(a) shows a photograph of nine fabricated devices on a 1×1 inch$^2$ substrate. Aiming for device operation in the telecommunications band over the 1300~1600 nm wavelength range, these devices have identical periods of $\Lambda$=854.0 nm but slightly different fill factors such that F gradually decreases from 0.12 for the bottom-left device to 0.05 for the top-right device. Clearly visible is the semi-transparency in the device areas due to the low Si-wire filling fraction. The best performance is obtained with a device with F=0.1. FIGS. 7(b), 7(c), and 7(d) show cross-sectional and top-view scanning electron microscope (SEM) images of this device. The measured geometrical parameters are indicated therein. To keep the promising sample undestroyed, we took the cross-sectional micrographs in FIG. 7(b) from a sacrificial sample fabricated with an identical process while the top-view micrographs in FIGS. 7(c) and 7(d) show the actual device whose optical spectrum is measured and presented here.

The fabricated sample is further prepared for spectral measurement. To establish an approximate optically-symmetric background environment, or host medium, we place an index-matching fluid with refractive index 1.526 between the cover and substrate glass slides with refractive index 1.520. Thus the device is immersed in an approximately homogeneous host medium with $\varepsilon_0$=1.52. Spectra are collected with an infrared spectrum analyzer (AQ6375, Yokogawa) and a super continuum light source (Koheras SuperK Compact, NKT Photonics). FIG. 8 shows the measured TE and TM extinction (1−$T_0$) and reflectance ($R_0$) spectra in comparison with theoretical predictions. In the calculation, we apply the exact cross-sectional shape of the fabricated structure as shown in the insets of FIGS. 8(c) and 8(d). We also use the experimental dielectric constant $\varepsilon_1$=12.25 of our Si film that we determine with ellipsometry (VASE Ellipsometer, J. A. Woollam). Shown in FIGS. 8(a) and 8(b) are the TE and TM extinction spectra in experiment and theory, respectively. We note that the extinction for lossless systems must be identical to the reflectance, i.e., 1−$T_0$=$R_0$, in the zero-order regime above the Rayleigh wavelength (white dotted lines). There is excellent quantitative agreement between theory and experiment across the wide angular and wavelength ranges considered. FIGS. 8(c) and 8(d) show the measured and theoretical spectra for the TE extinction, TE reflectance, and TM reflectance at normal incidence. The TE reflection bandwidth for $R_0$(TE)>0.9 is ~190 nm in the experiment and ~200 nm in the theory. We attribute the higher TM reflectance in the experiment to the specular reflections at the cover and substrate glass surfaces where about 4% of the incident optical power is reflected from each. In the theoretical spectrum in FIG. 8(d), the TM reflectance is below 0.5% over the wavelength region corresponding to the high TE-reflection plateau.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

REFERENCES

The following references, to the extent that they provide exemplary procedural or other details supplementary to those set forth above, are specifically incorporated by reference.

1. P. Vincent and M. Neviere, "Corrugated dielectric waveguides: A numerical study of the second-order stop bands," *Appl. Phys.*, vol. 20, no. 4, pp. 345-351, 1979.
2. L. Mashev and E. Popov, "Zero order anomaly of dielectric coated gratings," *Opt. Comm.*, vol. 55, no. 6, pp. 377-380, Oct. 15, 1985.
3. E. Popov, L. Mashev, and D. Maystre, "Theoretical study of anomalies of coated dielectric gratings," *J. Mod. Opt.*, vol. 33, no. 5, pp. 607-619, May 1986.
4. G. A. Golubenko, A. S. Svakhin, V. A. Sychugov, and A. V. Tishchenko, "Total reflection of light from a corrugated surface of a dielectric waveguide," *Sov. J. Quantum Electron.*, vol. 15, no. 7, pp. 886-887, 1985.
5. I. A. Avrutsky and V. A. Sychugov, "Reflection of a beam of finite size from a corrugated waveguide," *J. Mod. Opt.*, vol. 36, no. 11, pp. 1527-1539, November 1989.
6. R. Magnusson and S. S. Wang, "New principle for optical filters," *Appl. Phys. Lett.*, vol. 61, no. 9, pp. 1022-1024, August 1992.
7. S. S. Wang and R. Magnusson, "Theory and applications of guided-mode resonance filters," *Appl. Opt.*, vol. 32, no. 14, pp. 2606-2613, May 10, 1993.
8. Y. Ding and R. Magnusson, "Resonant leaky-mode spectral-band engineering and device applications," *Opt. Express*, vol. 12, no. 23, pp. 5661-5674, Nov. 15, 2004.
9. Kim, K.-H. & Song, J.-K. Technical evolution of liquid crystal displays. NPG Asia Mater. 1, 29-36 (2009).
10. Biss, D. P., Youngworth, K. S. & Brown, T. G. Dark-field imaging with cylindrical-vector beams. Appl. Opt. 45, 470-479 (2006).
11. Mundell, C. G., Kopač, D., Arnold, D. M., Steele, I. A., Gomboc, A., Kobayashi, S., Harrison, R. M., Smith, R. J., Guidorzi, C., Virgili, F. J., Melandri, A. & Japelj, J. Highly polarized light from stable ordered magnetic fields in GRB 120308A. Nature 504, 119-121 (2013).
12. Zhao, J., Li, B., Zhao, H., Wang, W., Hu, Y., Liu, S/ & Wang, Y. Generation of azimuthally polarized beams in fast axial flow CO2 laser with hybrid circular subwavelength grating mirror. Appl. Opt. 53, 3706-3711 (2014).
13. Crespi, A., Ramponi, R., Osellame, R., Sansoni, L. Bongioanni, I., Sciarrino, F., Vallone, G. & Mataloni, P. Integrated photonic quantum gates for polarization qubits. Nat. Commun. 2, 566; doi10.1038/ncomms1570 (2011).
14. Matioli, E., Brinkley, S., Kelchner, K. M., Hu, Y.-L., Nakamura, S., DenBaars, S., Speck, J. & Weisbuch, C. High-brightness polarized light-emitting diodes. Light-Sci. Appl. 1, e22; doi:10.1038/lsa.2012.22 (2012).
15. Streshinsky, M., Shi, R., Novak, A., Cher, R. T. P., Lim, A. E.-J., Lo, P. G.-Q., Baehr-Jones, T. & Hochnerg, M. A compact bi-wavelength polarization splitting grating coupler fabricated in a 220 nm SOI platform. Opt. Express 21, 31019-31028 (2013).
16. Ahmed, M. A., Haefner, M., Vogel, M., Pruss, C., Voss, A., Osten, W. & Graf. T. High-power radially polarized Yb:TAG thin-disk laser with high efficiency. Opt. Express 19, 5093-5104 (2011).
17. Levy, U., Tsai, S.-H., Pang, L. & Fainman, Y. Engineering space-variant inhomogeneous media for polarization control. Opt. Lett. 29, 1718-1720 (2004).
18. Kämpfe, T., Sixt, P., Renaud, D., Lagrange, A., Perrin, F. & Parriaux, O. Segmented subwavelength silicon gratings manufactured by high productivity microelectronic technologies for linear to radial/azimuthal polarization conversion. Opt. Engineering 53, 107105 (2014).
19. Ohtera, Y., Sato, T., Kawashima, T., Tamamura, T. & Kawakami, S. Photonic crystal polarization splitters. Electron. Lett. 35, 1271-1272 (1999).
20. Tuan, R.-C., Salvekar, A. A., Chou, H.-P., Chen, C.-C., Scherer, A., Sun, P.-C., Xu, F. & Fainman, Y. Design, fabrication, and characterization of form-birefringent multilayer polarizing beam splitter. J. Opt. Soc. Am. A 14, 1627-1636 (1997).
21. Delbeke, D., Baets, R. & Muys, P. Polarization-selective beam splitter based on a highly efficient simple binary diffraction grating. Appl. Opt. 43, 6157-6165 (2004).
22. K. J. Lee, J. Curzan, M. Shokooh-Saremi, and R. Magnusson, "Resonant wideband polarizer with single silicon layer," *Appl. Phys. Lett.*, vol. 98, pp. 211112-1, May 25, 2011.
23. Lee, K. J., Giese, J. Ajayi, L., Magnusson, R. & Johnson, E. Resonant grating polarizers made with silicon nitride, titanium dioxide, and silicon: Design, fabrication, and characterization. Opt. Express 22, 9271-9281 (2014).
24. Moharam, M. G., Grann, E. B., Pommet, D. A. & Gaylord, T. K. Formulation for stable and efficient implementation of the rigorous coupled-wave analysis of binary gratings. J. Opt. Soc. Am. A 12, 1068-1076 (1995).
25. Rosenblatt, D., Sharon, A. & Friesem, A. A. Resonant Grating Waveguide Structures. IEEE J. Quantum Electron. 33, 2038-2059 (1997).
26. Karagodsky, V., Sedwick, F. G. & Chang-Hasnain, C. J. Theoretical analysis of subwavelength high contrast grating reflectors. Opt. Express 18, 16973-16988 (2010).
27. Magnusson, R. Wideband reflectors with zero-contrast gratings. Opt. Lett. 39, 4337-4340 (2014).

28. H. Kogelnik and V. Ramaswami, Scaling rules for thin-film optical waveguides, Appl. Opt. 13 (8), 1857-1862 (1974).
29. C. F. R. Mateus, M. C. Y. Huang, L. Chen, C. J. Chang-Hasnain, and Y. Suzuki, "Broad-band mirror (1.12-1.62 □m) using a subwavelength grating," *IEEE Photon. Technol. Lett.*, vol. 16, no. 7, pp. 1676-1678, July 2004.
30. R. Magnusson and M. Shokooh-Saremi, "Physical basis for wideband resonant reflectors," *Opt. Exp.*, vol. 16, no. 5, pp. 3456-3462, Mar. 3, 2008.
31. S. M. Rytov, "Electromagnetic properties of a finely stratified medium", *Sov. Phys. JETP* 2, 466-475 (1956).
32. Palik, E. D (ed.). Handbook of optical constants of solids (Academic, 1985).
33. Bolivar, P. H., Brucherseifer, M., Rivas, J. G., Gonzalo, R., Ederra, I., Reynolds, A. L., Holker, M., & de Maagt, P. Measurement of the dielectric constant and loss tangent of high dielectric-constant materials at terahertz frequencies. IEEE Trans. Microw. Theory Tech. 51, 1062-1066 (April 2003).
34. Homes, C. C., Vogt, T., Shapiro, S. M., Wakimoto, S., & Ramirez, A. P. Optical response of high-dielectric-constant perovskite-related oxides. Nature 293, 673-676 (July, 2001).
35. He, Y., He, S., Gao, J. & Yang, X. Nanoscale metamaterial optical waveguides with ultrahigh refractive indices. J. Opt. Soc. Am. B 29, 2559-2566 (August 2012).
36. Choi, M., Lee, S. H., Kim, Y., Kang, S. B., Shin, J., Kwak, M. H., Kang, K.-Y., Lee, Y.-H., Park, N. & Min, B. A terahertz metamaterial with unnaturally high refractive index. Nature 470, 369-373 (February 2011).
37. R. Eberhart and J. Kennedy, "Particle swarm optimization," in *Proceedings of the IEEE International Conference on Neural Networks*, pp. 1942-1948, 1995.
38. M. Shokooh-Saremi and R. Magnusson, "Particle swarm optimization and its application to the design of diffraction grating filters," *Opt. Lett.*, vol. 32, no. 8, pp. 894-896, Apr. 15, 2007.
39. A. Taflove and S. C. Hagness, Computational Electrodynamics: The Finite-Difference Time-Domain Method, 2nd ed., Artech House, 2000.
40. http://optics.synopsys.com/rsoft/

That which is claimed is:

1. A method of polarizing light, the method comprising:
receiving with a polarizer an incident electromagnetic wave, the polarizer comprising a grating layer composed of a material with a dielectric constant of £1 and a host region with a dielectric constant of $\varepsilon_0$, wherein said grating layer is present in the polarizer and is embedded in said host region and wherein said grating layer has a fill factor F that is less than 0.3;
reflecting a TE-polarized electric-field component of the incident electromagnetic wave with the polarizer within a spectral band; and
transmitting a TM-polarized electric-field component of the incident electromagnetic wave with the polarizer within the same spectral band,
wherein TE-polarized reflectance of the incident electromagnetic wave within the spectral band exceeds 90%;
wherein receipt of any incident electromagnetic wave within the spectral band by the polarizer causes:
reflection of the TE-polarized electric-field component of the incident electromagnetic wave within the spectral band, and transmission of the TM-polarized electric-field component of the incident electromagnetic wave within the same spectral band; and
wherein TM-polarized transmittance of the incident electromagnetic wave within the spectral band exceeds 90%.

2. The method of claim 1, wherein the dielectric constant $\varepsilon_1$ lies in the range of 2 to 1000.

3. The method of claim 1, wherein the dielectric constant Co lies in the range of 1 to 100.

4. The method of claim 1, wherein the incident electromagnetic wave is from one or more of a spectral region selected from a group consisting of a ~1.2-12 μm spectral region, a ~700-1000 nm region, a UV region spanning 100-400 nm, a visible region spanning ~400-700 nm, a ~10 um to 1000 um region, and a 1 mm to 10 cm microwave region.

5. The method of claim 1, wherein the grating layer is made from one or more materials selected from a group consisting of Si, Ge, GaAs, GaP, SiC, $TiO_2$, $HfO_2$, $SiO_2$, and GaN.

6. The method of claim 1, wherein the host region comprises one or more of air, vacuum, polymer, plastic, glass, spin-on glass, oil, liquid crystal, silicone, polydimethylsiloxane, and water.

7. The method of claim 1, wherein:
the grating layer is made from one or more materials selected from a group consisting of Si, Ge, GaAs, GaP, SiC, $TiO_2$, $HfO_2$, $SiO_2$, and GaN; and
the host region comprises one or more of air, vacuum, polymer, plastic, glass, spin-on glass, oil, liquid crystal, silicone, polydimethylsiloxane, and water.

8. The method of claim 1, wherein the incident electromagnetic wave has a polarization state selected from the group of randomly polarized, unpolarized, linearly polarized, elliptically polarized, and circularly polarized.

9. The method of claim 1, wherein the incident electromagnetic wave is at normal incidence.

10. The method of claim 1, wherein the incident electromagnetic wave is at non-normal incidence.

11. The method of claim 1, wherein the incident electromagnetic wave is in one or more spectral regions of at least one of the spectral regions selected from the group of ultra-violet, infrared, near-infrared, THz, and microwave regions.

12. The method of claim 1, wherein said grating layer has a fill factor F of 0.05 to 0.12.

13. The method of claim 1, wherein the TM-polarized electric-field component of the incident electromagnetic wave is neither diffracted nor guided by the polarizer in the spectral band.

14. The method of claim 1, wherein the TE-polarized electric-field component of the incident electromagnetic wave is both diffracted and guided by the polarizer within the spectral band.

15. The method of claim 1, wherein:
the TM-polarized electric-field component of the incident electromagnetic wave is neither diffracted nor guided by the polarizer within the spectral band; and
the TE-polarized electric-field component of the incident electromagnetic wave is both diffracted and guided by the polarizer within the spectral band.

* * * * *